Inventor
Maurice G. Petersen
By Clarence A. O'Brien
Attorneys

Sept. 24, 1940.   M. G. PETERSEN   2,215,765
BRAKING ATTACHMENT
Filed May 7, 1940   2 Sheets-Sheet 2
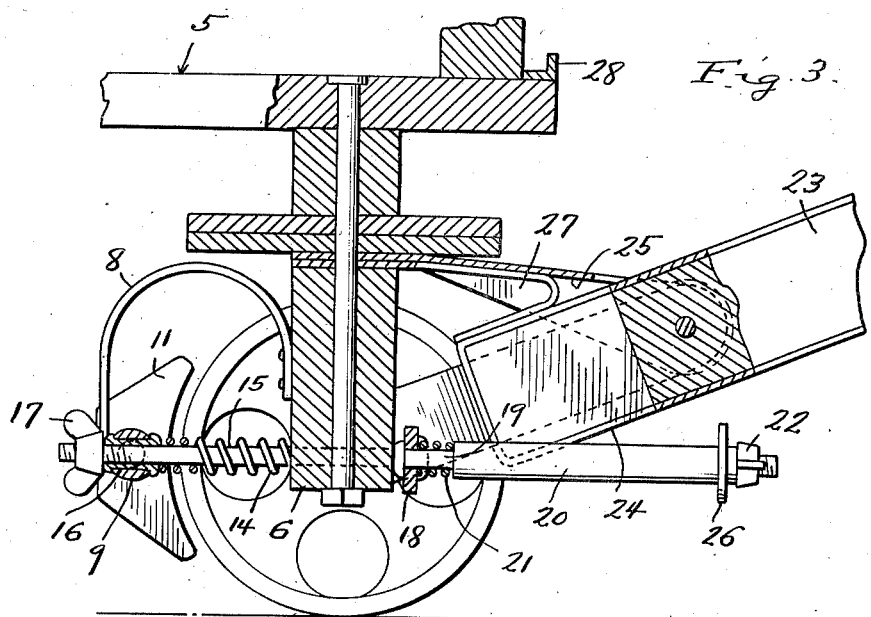
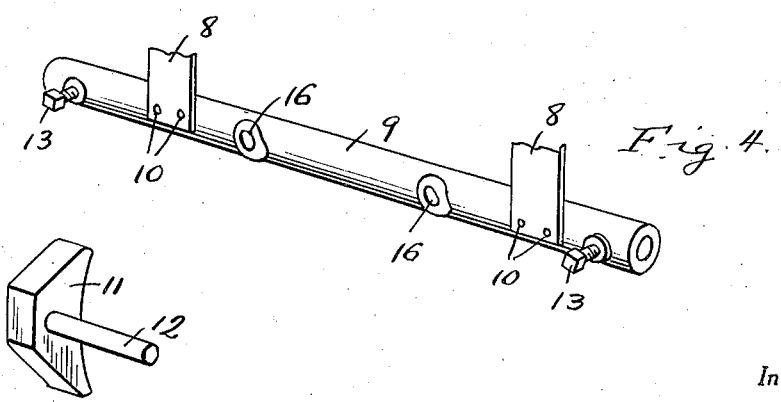
Inventor
Maurice G. Petersen
By
Attorneys Patented Sept. 24, 1940

2,215,765

UNITED STATES PATENT OFFICE 2,215,765

BRAKING ATTACHMENT

Maurice G. Petersen, Centralia, Wash.

Application May 7, 1940, Serial No. 333,823

3 Claims. (Cl. 188—119)

This invention is a brake attachment, and an object of the invention is to provide an attachment of this character particularly designed for mounting on baggage trucks and analogous vehicles to the end that when the truck is not in motion or connected with a draft vehicle, the brakes forming part of the attachment are substantially automatically applied.

In accordance with the present invention a brake attachment applied to a hand truck in accordance with the teachings of the present invention will eliminate the use of anchor chains on rear wheels, chock blocks and other instrumentalities now resorted to for holding such a vehicle against being accidentally or otherwise unintentionally set in motion.

The invention, together with its objects and advantages, will be best understood from a study of the following description taken in connection with the accompanying drawings wherein:

Figure 3 is a detail sectional view taken substantially on the line 3—3 of Figure 2.

Figure 4 is a perspective view of a brake bar, and

Figure 5 is a perspective view of a brake shoe.

Figure 1:
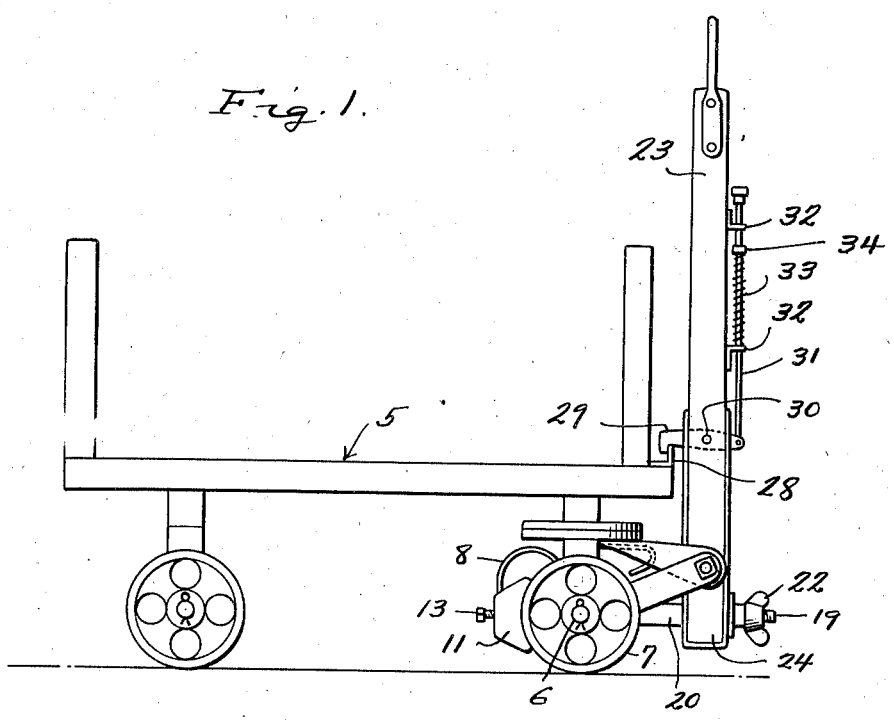
Figure 1 is a side elevational view of a baggage truck with the brake attachment applied thereto and with the brakes shown in applied position.
Figure 2:
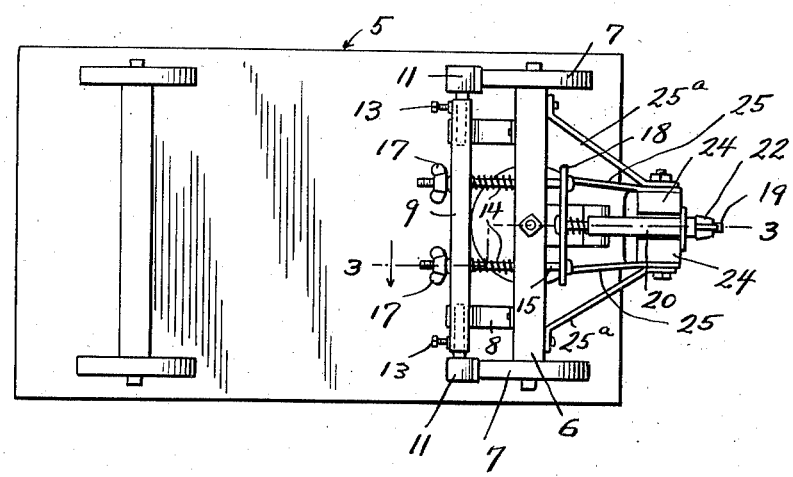
Figure 2 is a bottom plan view of the structure shown in Figure 1.

Referring more in detail to the drawings it will be seen that 5 indicates generally a baggage truck, the construction of which is not of the essence of the present invention. Accordingly, only such parts of the truck 5 will be referred to specifically as deemed necessary for a clear understanding of the invention.

In accordance with the present invention there are secured to the axle 6 of the steering wheels 7 of the truck one end of inverted substantially U-shaped suspension springs 8 that serve to suspend in parallelism with the axle 6 a transverse tubular brake rod 9, and to which rod the springs 8 are secured as at 10.

At the opposite ends of the rod 9 are brake shoes 11 arranged to engage the wheels 7, and these shoes 11 have extending laterally therefrom shanks 12 that have a working fit in the respective opposite ends of the rod 9 and are engaged by screws 13 through the medium of which the shoes 11 are secured in adjusted position with respect to the rod 9 and as required for proper engagement of the shoes with the wheels 7.

The inherent tendency of the springs 8 to expand serve to yieldably retain the shoes 11 out of engagement with the wheels 7. This action of the suspension springs 8 is supplemented by coil springs 14 disposed about bolts 15 that work through transverse openings provided therefor in the axle 6 and have nut-equipped ends accommodated in transverse openings 16 provided therefor in the brake rod 9. On said ends of the bolts are wing nuts 17.

The springs 14 are interposed on the bolts 15 between the axle 6 and the brake rod 9 and by turning the nuts 17 on the bolts the tension of the springs 14 may be adjusted as found desirable.

At the head-equipped ends thereof the bolts 15 are connected by a bar or plate 18 through an intermediate portion of which extends the headed end of a brake-actuating rod 19. Interposed on the brake-actuating rod 19 between the plate 18 and a sleeve 20 on the rod 19 is a coil spring 21 that tends to project the rod 19 forwardly with respect to the plate 18.

The sleeve 20 is held on the rod 19 between the spring 21 and a wing nut 22 threaded on the free end of the rod 19.

Further in accordance with the present invention the draft tongue 23 is pivoted between a pair of bracket arms 25 that extend forwardly from the truck at the end of the truck equipped with the wheels 7, and at its pivoted end the tongue 23 is bifurcated to provide a pair of coextensive legs 24 that straddle the sleeve 20 and act to engage a fixed collar 26 on the sleeve 20 as the tongue 23 is swung from a substantially horizontal position to the vertical position shown in Figure 1. In this connection it will be noted that as the tongue 23 is swung from substantially the position shown in Figure 3 to the position shown in Figure 1 the extensions 24 of the tongue will abut the shoulder 26 on the sleeve 20 causing a pull to be exerted against the action of springs 14 and 8 on the bolts 15. As a consequence the brake rod 9 will be urged towards the axle 6 and the shoes 11 brought into frictional contact with the peripheries of the wheels 7 for applying a braking action to said wheels.

Obviously as the tongue 23 is swung downwardly from the position shown in Figure 1 to substantially the position shown in Figure 3 springs 14 and 8 will tend to expand, thus moving the brake shoes 11 out of engagement with the wheels 7 for releasing the truck.

A combination abutment and cushion spring element 27 is mounted on and extends forwardly from the front axle 6 as best shown in Figure 3 and against which the bifurcated end of the tongue 23 strikes as it swings down to substantially horizontal position to be used for draft purposes.

For releasably securing the tongue 23 in vertical position, and consequently in a position for releasably maintaining the brake shoes 11 engaged with the wheels 8 there is suitably mounted on the front edge of the body of the truck a keeper lug 28. Cooperable with the lug 28 is a latch 29 pivotally mounted on the tongue 23 as at 30 and connected pivotally with one end of the latch 29 is a release rod 31. Rod 31 works in suitable guides 32 provided therefor on the underside of the tongue 23, and latch 29 is normally biased into a position for engaging the lug 28 through the medium of a coil spring 33. Spring 33 is disposed about the rod 31 and at one end impinges against one of the guides 32 and at an opposite end impinges against a collar or shoulder 34 provided therefor on the rod 31.

Thus it will be seen that as the tongue 23 is swung upwardly to the position shown in Figure 1, latch 29 substantially automatically engages the keeper 28 for releasably retaining the tongue 23 in this vertical position and consequently the brake shoes 11 engage with the wheels 7.

To release the latch the operator pushes downwardly on the rod 31 against the action of spring 33, thus causing the latch member 29 to swing upwardly and clear the keeper 28. Upon such clearance of the lug 28 by the latch 29, tongue 23 is free to drop downwardly into position for attachment to a draft vehicle or for use otherwise convenient to the proper use of the truck.

Bracket arms 25 are braced relative to axle 6 by braces 25a.

It is thought that a clear understanding of the construction, operation, and advantages of a brake attachment of this character will be had without a more detailed description thereof.

Having thus described the invention what is claimed as new is:

1. In combination with a vehicle including an axle, wheels mounted on the respective opposite ends of the axle, and a draft tongue pivoted in proximity to the axle, a brake rod substantially paralleling said axle, means supporting the brake rod from the axle for movement toward and away from the axle, and including means normally urging the brake rod away from the axle, brake shoes on the respective opposite ends of the brake rod for engaging the wheels on the axle for applying a braking action thereto, a brake-operating rod mounted on the vehicle and movable in a horizontal plane substantially at right angles to the axle, supporting means for said brake-operating rod, an operating connection between said rod and said brake rod for transmitting movement of said actuating rod to the brake rod for applying the brake shoes, and interengaging means on said brake-operating rod and said tongue cooperable for shifting said brake rod in a direction for applying the brake shoes incidental to an upwardly swinging movement of said draft tongue.

2. In combination with a vehicle including an axle, wheels mounted on the respective opposite ends of the axle, and a draft tongue pivoted in proximity to the axle, a brake rod substantially paralleling said axle, means supporting the brake rod from the axle for movement toward and away from the axle, and including means normally urging the brake rod away from the axle, brake shoes on the respective opposite ends of the brake rod for engaging the wheels on the axle for applying a braking action thereto, a brake-operating rod mounted on the vehicle and movable in a horizontal plane substantially at right angles to the axle, supporting means for said brake-operating rod, an operating connection between said rod and said brake rod for transmitting movement of said operating rod to the brake rod for applying the brake shoes, and interengaging means on said brake-operating rod and said tongue cooperable for shifting said brake rod in a direction for applying the brake shoes incidental to an upwardly swinging movement of said draft tongue, and spring-biased latch means including coacting parts mounted on the vehicle and tongue, respectively, for releasably securing the tongue in vertical position.

3. In combination with a baggage truck including steering wheels embodying an axle for said wheels, and a draft tongue pivotally mounted on the ends of the truck at the steering wheel-equipped end thereof, a brake rod disposed in parallelism to said axle, resilient suspension means connected to said axle and said rod for suspending the latter from the axle, brake shoes mounted on the ends of said rod and adjustable in a longitudinal direction relative to said rod for engagement with the steering wheels, and an operating connection between said brake rod and said tongue for shifting the brake rod to engage the brake shoes with said wheels incidental to an upward swinging movement of said tongue and for releasing the brake shoes incidental to a downward swinging movement of said tongue.

MAURICE G. PETERSEN.